US008099205B2

(12) United States Patent
Coats et al.

(10) Patent No.: US 8,099,205 B2
(45) Date of Patent: Jan. 17, 2012

(54) MACHINE GUIDANCE SYSTEM

(75) Inventors: Robert M. Coats, Peoria, IL (US);
Michael Sean McDaniel, Peoria, IL
(US); David J. Edwards, Dunlap, IL
(US); Ramkumar Subramanian,
Peoria, IL (US); Kenneth L. Stratton,
Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 804 days.

(21) Appl. No.: 12/216,582

(22) Filed: Jul. 8, 2008

(65) Prior Publication Data

US 2010/0010703 A1 Jan. 14, 2010

(51) Int. Cl.
*G06F 17/00* (2006.01)
*G05D 1/00* (2006.01)

(52) U.S. Cl. .............. 701/23; 701/27; 701/28; 701/116

(58) Field of Classification Search .................... 701/23, 701/41, 32, 1, 28, 27, 116
See application file for complete search history.

(56) References Cited

U.S. PATENT DOCUMENTS

| 4,630,109 | A | | 12/1986 | Barton | |
|---|---|---|---|---|---|
| 5,081,585 | A | | 1/1992 | Kurami et al. | |
| 5,155,426 | A | | 10/1992 | Kurami | |
| 5,646,845 | A | | 7/1997 | Gudat et al. | |
| 5,875,408 | A | * | 2/1999 | Bendett et al. | 701/23 |
| 6,009,377 | A | * | 12/1999 | Hiwatashi | 701/301 |
| 6,038,496 | A | | 3/2000 | Dobler et al. | |
| 6,092,010 | A | * | 7/2000 | Alofs et al. | 701/23 |
| 6,246,933 | B1 | | 6/2001 | Bagué | |
| 6,296,317 | B1 | | 10/2001 | Ollis et al. | |
| 6,349,249 | B1 | | 2/2002 | Cunningham | |
| 6,526,352 | B1 | | 2/2003 | Breed et al. | |
| 6,678,590 | B1 | | 1/2004 | Burchfiel | |
| 6,721,453 | B1 | | 4/2004 | Benson et al. | |
| 6,751,535 | B2 | * | 6/2004 | Mori | 701/23 |
| 7,510,038 | B2 | * | 3/2009 | Kaufmann et al. | 180/169 |
| 7,698,032 | B2 | * | 4/2010 | Matsumoto et al. | 701/36 |
| 7,774,123 | B2 | * | 8/2010 | Schroder | 701/96 |
| 2004/0048583 | A1 | * | 3/2004 | Everett | 455/99 |
| 2004/0167678 | A1 | * | 8/2004 | Frank et al. | 701/1 |
| 2004/0240710 | A1 | | 12/2004 | Lages et al. | |
| 2005/0024492 | A1 | | 2/2005 | Schaefer et al. | |
| 2006/0147089 | A1 | | 7/2006 | Han et al. | |
| 2006/0149472 | A1 | | 7/2006 | Han et al. | |
| 2006/0195238 | A1 | * | 8/2006 | Gibson et al. | 701/23 |

* cited by examiner

*Primary Examiner* — Drew Brown
(74) *Attorney, Agent, or Firm* — Finnegan, Henderson, Farabow, Garrett & Dunner LLP

(57) ABSTRACT

A guidance system for a mobile machine is disclosed. The guidance system may have a scanning device configured to generate a signal indicative of a lateral distance from the machine to a roadway marker, a locating device configured to determine a geographical location of the machine, and a controller in communication with the scanning device and the locating device. The controller may be configured to receive a desired lateral distance from the machine to the roadway marker, and to compare the desired lateral distance to the actual lateral distance. The controller may further be configured to implement a response to the comparison based on the geographical location.

16 Claims, 2 Drawing Sheets

MACHINE GUIDANCE SYSTEM

TECHNICAL FIELD

The present disclosure relates generally to a guidance system and, more particularly, to a guidance system for a mobile machine.

BACKGROUND

Machines such as, for example, off-highway haul trucks, motor graders, snow plows, and other types of heavy equipment are used to perform a variety of tasks. Some of these tasks involve carrying or pushing large, awkward, loose, and/or heavy loads up steep inclines or along rough or poorly marked haul roads. And, because of the size and momentum of the machines and/or because of poor visibility, these tasks can be difficult for a human operator to complete effectively.

To help guide the machines along the haul roads and keep the machines within appropriate lanes on the haul roads, some worksites utilize earthen berms located at the sides of the haul roads. The berms act as borders of the haul road, providing a visual indication of the edge of the road and functioning to either redirect the machine back onto the road or hinder further movement off of the road, should the machine deviate from an appropriate lane. Although effective, the use of the earthen berms alone may be insufficient to keep some large or heavily loaded machines on the haul roads and, in some situations, may damage the machines when the machines contact the berms. As such, an alternative or additional method for keeping the machines within the appropriate lanes of a haul road may be necessary.

One such method is described in U.S. Pat. No. 6,038,496 (the '496 patent) issued to Dobler et al. on Mar. 14, 2000. Specifically, the '496 patent describes a vehicle provided with laterally mounted optical scanning devices for zero-contact scanning of a lateral highway area, and an evaluation unit connected thereto. The optical scanning devices each comprises a linear array of infrared transmitting devices located side-by-side, and a corresponding charge-coupled device (CCD) array. The connected evaluation unit is programmed to perform time measurement, contrast measurement, and contour recognition based on input from the CCD array. With this optical scanning system, an operator may be warned of lane deviation or automatic lane maintenance can be provided, with different reactions to various lane boundaries being possible.

During operation of the optical scanning system described in the '496 patent, the system scans the lateral surface of the highway (i.e., an area to the sides of the vehicle) to detect any existing lane boundary, a type of lane boundary (i.e., a painted stripe, a curb, or a corrugated strip), and a nature of an area outside of the lane boundary (i.e., another travel lane, a breakdown lane, or a highway boundary). A running time and contrast determination permit recognition of lateral lane markings, and determination of the distance of the vehicle therefrom. The optical scanning system then functions to either warn an operator when the distance from the vehicle to the lateral lane marking deviates from a value preset by the driver, or automatically maintains the preset distance value in a manner similar to conventional cruise control regulating. Based on the type of lane boundary, the warning provided by the optical scanning system can change. For example, when the lane boundary is a corrugated strip, the warning is an audible sound similar to that of a rumble strip, suggesting to the driver that the lane marking is studded with bumps or provided with corrugated strips. Similarly, the warning is adjusted based on the area outside of the lane boundary, for example if that area can be driven on. Based on the area outside of the lane boundary, a timing of the warning is adjusted to allow the driver sufficient time and space to keep the vehicle on the highway or to return it thereto.

Although the optical scanning system of the '496 patent may improve guidance of a vehicle, it may be expensive and limited. Specifically, the infrared transmitting devices and CCD array are costly. In addition, the optical scanning system may be unable to detect an area on an opposing side of a raised earthen berm to determine if that area can be driven on. As such, the optical scanning system cannot properly adjust the warning provided to the operator or autonomously control the vehicle based on the detection. Further, the optical scanning system of the '496 patent does not take into account conditions that could affect maneuverability of the vehicle. In addition, the optical scanning system of the '496 patent only affects steering of the vehicle, which may be insufficient to control the vehicle in some situations.

The disclosed guidance system is directed to overcoming one or more of the problems set forth above and/or other problems of the prior art.

SUMMARY OF THE INVENTION

In one aspect, the present disclosure is directed to a guidance system for a machine. The guidance system may include a scanning device configured to generate a signal indicative of an actual lateral distance from the machine to a roadway marker, a locating device configured to determine a geographical location of the machine, and a controller in communication with the scanning device and the locating device. The controller may be configured to receive a desired lateral distance from the machine to the roadway marker, and to compare the desired lateral distance to the actual lateral distance. The controller may be further configured to implement a response to the comparison based on the geographical location.

In yet another aspect, the present disclosure is directed to a method of guiding a machine. The method may include measuring an actual lateral distance from the machine to a roadway marker, receiving a desired lateral distance from the machine to the roadway marker, and comparing the desired lateral distance to the actual lateral distance. The method may also include determining a geographical location of the machine, and implementing a response to the comparison based on the geographical location.

DETAILED DESCRIPTION

Figure 1:
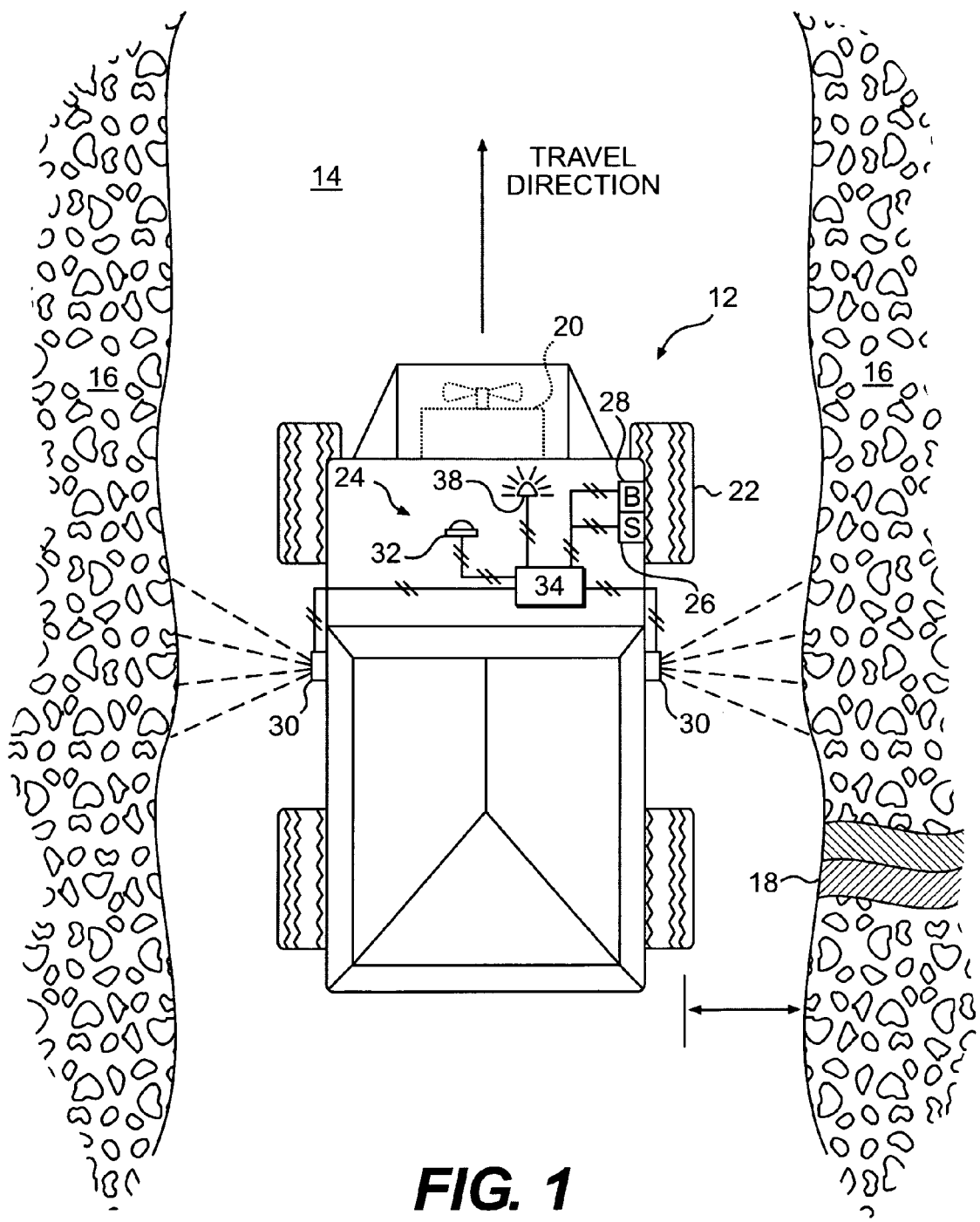
FIG. 1 is a pictorial illustration of an exemplary disclosed machine.

FIG. 1 illustrates a worksite 10 and an exemplary machine 12 performing a task at worksite 10. Worksite 10 may include, for example, a mine site, a landfill, a quarry, a construction site, or any other type of worksite having a roadway 14 traversable by machine 12. Roadway 14 may be bordered on at least one side by a marker 16, for example an earthen berm. In addition to marking a border of roadway 14, the earthen berm may also provide a barrier to machine 12 that inhibits machine 12 from leaving roadway 14 and/or redirects machine 12 toward a center of roadway 14 when machine 12 contacts the earthen berm. Distances along roadway 14 may be marked such that, by monitoring the marked distances traveled by machine 12 along roadway 14 from a fixed starting point, a geographical location of machine 12 may be determined. In one example, the distances may be marked by a break 18 in the earthen berm. It is contemplated, however, that other ways to mark the distances along roadway 14 may be utilized. Although shown in FIG. 1 as a single lane roadway, it is contemplated that roadway 14 may alternatively include multiple lanes, if desired.

The task being performed by machine 12 may be associated with altering the geography at worksite 10 and may include, for example, a hauling operation, a grading operation, a leveling operation, a plowing operation, a bulk material removal operation, or any other type of operation. As such, machine 12 may embody a mobile machine, for example a haul truck, a motor grader, a loader, or a snow plow. Machine 12 may include, among other things, a power source 20, one or more traction devices 22, and a guidance system 24. Power source 20 may generate and provide power to traction devices 22, while guidance system 24 may regulate operation of traction devices 22 and/or power source 20 in response to various input.

Power source 20 may embody an internal combustion engine such as, for example, a diesel engine, a gasoline engine, a gaseous fuel powered engine, or any other type of engine apparent to one skilled in the art. Power source 20 may alternatively or additionally include a non-combustion source of power such as a fuel cell, a power storage device, an electric motor, or other similar mechanism. Power source 20 may be connected to drive traction devices 22 via a direct mechanical coupling, a hydraulic circuit, an electrical circuit, or in any other suitable manner.

Traction device 22 may be a wheel, a belt, a track or any other driven traction device known in the art. Traction device 22 may be driven by power source 20 to rotate and propel machine 12 in accordance with an output rotation of power source 20. A steering device 26, for example a hydraulic cylinder, a hydraulic motor, an electric motor, and/or a rack-and-pinion configuration may be associated with one or more traction device 22 to affect steering thereof. In addition, a braking device 28, for example a compression disk brake, an internal fluid brake, an engine retarder, an exhaust brake, and/or a transmission brake may be associated with one or more traction device 22 and/or power source 20 to affect braking of machine 12.

Guidance system 24 may include multiple components that interact to regulate maneuvering of machine 12. Specifically, guidance system 24 may include one or more scanning devices 30, a locating device 32, and a controller 34 in communication with each scanning device 30, locating device 32, steering device 26, and braking device 28. Controller 34 may be configured to control maneuvering (i.e., steering and/or braking) of machine 12 based on input received from scanning devices 30, locating device 32, and/or an operator of machine 12.

Scanning device 30 may be attached to a side of machine 12 to sense an actual lateral distance from machine 12 to marker 16 (i.e., a distance substantially orthogonal to a travel direction of machine 12) and to generate a distance signal in response thereto. Each scanning device 30 may embody a device that detects and ranges objects, for example a LIDAR (light detection and ranging) device, a RADAR (radio detection and ranging) device, a SONAR (sound navigation and ranging) device, or another device known in the art. In one example, scanning device 30 may include an emitter that emits a detection beam, and an associated receiver that receives a reflection of that detection beam. Based on characteristics of the received beam, an actual lateral distance from machine 12 to marker 16 may be determined. Scanning device 30 may then generate a distance signal corresponding to the actual lateral distance, and communicate the distance signal to controller 34. Based on an interruption of the distance signal corresponding to break 18, a location with respect to a known starting point may be determined (i.e., the geographical location of machine 12 may be determined based on a distance traveled from the known starting point).

Alternatively or additionally, locating device 32 may be used to determine the geographical location of machine 12. In particular, locating device 32 may embody an electronic receiver configured to communicate with one or more satellites or a local radio or laser transmitting system to determine a relative location of itself. In these embodiments, locating device 32 may receive and analyze high-frequency, low power radio or laser signals from multiple locations to triangulate a relative 3-D location. Alternatively, locating device 32 may embody an Inertial Reference Unit (IRU), an odometer associated with traction device 22, or any other known locating device operable to receive or determine locational information associated with machine 12. A location signal indicative of this location may then be communicated from locating device 32 to controller 34.

Controller 34 may include means for monitoring, recording, storing, indexing, processing, and/or communicating the lateral distance between machine 12 and marker 16 and the geographical location of machine 12, and for autonomously controlling maneuvering of machine 12 in response to this information. These means may include, for example, a memory, one or more data-storage devices, a central processing unit, or any other components that may be used to run the disclosed application. Furthermore, although aspects of the present disclosure may be described generally as being stored within memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 34 may be configured to compare a desired lateral distance from machine 12 to marker 16 with the actual lateral distance provided by scanning device 30, and respond according to this comparison. Specifically, based on a difference between the desired lateral distance and the actual lateral distance (e.g., based on an error value calculated as a function of this difference), controller 34 may respond in a number of different ways. For example, if the actual lateral distance is about equal to or greater than the desired lateral distance, controller 34 may not respond at all. However, if the actual lateral distance is less than the desired lateral distance by a threshold amount, controller 34 may warn an operator of machine 12 of imminent danger or recommend action by the operator, autonomously control steering device 26 to increase the actual lateral distance, and/or autonomously control braking device 28 to slow or even stop travel of machine 12 toward marker 16. The warning or recommendation may be audible, visual, or a combination of both audible and visual stimulation. For this purpose, a warning device 38 may be included within the operator station of machine 12. In one example, controller 34 may also display within the operator station a position of machine 12 relative to marker 16, if desired.

In one embodiment, the desired lateral distance may be received from an operator of machine 12. That is, each operator may have a personal preference for the distance that should be maintained between machine 12 and marker 16. As such, controller 34 may allow the operator to input and/or adjust the desired lateral distance at startup of machine 12 and/or during operation thereof. This input may be received by way of an operator interface device (not shown) located within the operator station of machine 12. In one embodiment, the operator interface device may be a keyboard, a mouse, a touch screen display, a laptop computer, or other similar device.

Alternatively or additionally, the desired lateral distance may be set or vary based on a likelihood of machine 12 contacting or crossing marker 16. Specifically, if the likelihood of machine 12 contacting or crossing marker 16 is high, the desired lateral distance may be increased. Similarly, if the likelihood of machine 12 contacting or crossing marker 16 is low, the desired lateral distance may be decreased. The likelihood of machine 12 contacting or crossing marker 16 may be affected by a roadway condition, an environmental condition, a machine condition, an operator condition, and or other similar conditions. For example, a rough roadway having a loose or slick surface may decrease a stability of machine 12, thereby increasing the likelihood of machine 12 veering off course into contact with marker 16. Similarly, a heavily loaded, older haul truck traveling at high speed may have less stability, reduced stopping power, and/or reduced steering than a lightly loaded newer motor grader traveling at a slower speed. Thus, the haul truck may having a greater likelihood of contacting or crossing marker 16 than the motor grader and subsequently require a greater lateral distance from marker 16 be maintained. Further, an operator having less experience and/or a lower skill level may require more response time than an experienced operator and, thus, a greater lateral distance should be maintained between machine 12 and marker 16 for a new operator.

Similarly, the desired lateral distance may be set or vary based on a potential severity associated with machine 12 contacting or crossing marker 16. This potential severity can change based on a financial value of machine 12 and/or an amount of damage that could be caused by machine 12 leaving roadway 14. For example, if the geographical location of machine 12 provided by locating device 32 corresponds with an edge of cliff, leaving roadway 14 could have significant consequences (i.e., the severity associated with machine 12 leaving roadway 14 at this location could be high). In contrast, if the geographical location of machine 12 corresponds with flat level terrain, leaving roadway 14 may have minor consequences (i.e., the severity associated with machine 12 leaving roadway 14 at this location could be low). For this purpose, controller 34 may relate locational information from locating device 32 to local terrain and, subsequently, to the potential severity involved with machine 12 leaving roadway 14 at a particular geographical location.

Controller 34 may be configured to receive risk information (i.e., roadway condition information, environmental condition information, machine condition information, operator condition information, geographical location information, and other information associated with the likelihood of machine 12 leaving roadway 14 and/or the severity of doing so) at startup of machine 12, on a periodic basis, and/or continuously by way of the operator interface device, location device 32, geographical maps contained within the memory of controller 34, an offboard system (not shown), and/or in other ways. It is also contemplated that some or all of this information may be monitored by way of onboard sensors, if desired. For example, machine loading information may be provided by way of one or more load cells (not shown), roadway conditions and environmental conditions may be provided by way of a traction device slip sensor (not shown), operator conditions may be provided by way of an operator identity sensor (not shown), machine conditions may be provided by way of a travel speed sensor or an hour meter, etc. Based on this received information, controller 34 may be configured to adjust the desired lateral distance to reduce the likelihood of machine 12 leaving roadway 14 and/or the severity of doing so (i.e., to change the desired lateral distance and/or machine travel speed based on the perceived risk level).

In addition, controller 34 may be configured to respond differently to the comparison of the desired lateral and actual lateral distances based on the perceived risk level. For example, if the risk level is perceived to be low, controller 34 may only warn the operator of machine 12 about the lateral distance difference. In contrast, if the risk level is perceived to be high, controller 34 may warn the operator, affect steering, and/or affect braking of traction devices 22 in response to the same lateral distance difference. The way that controller 34 responds to the lateral distance difference may be provided to controller 34 at manufacture of machine 12 and/or adjusted by operator instruction.

Figure 2:
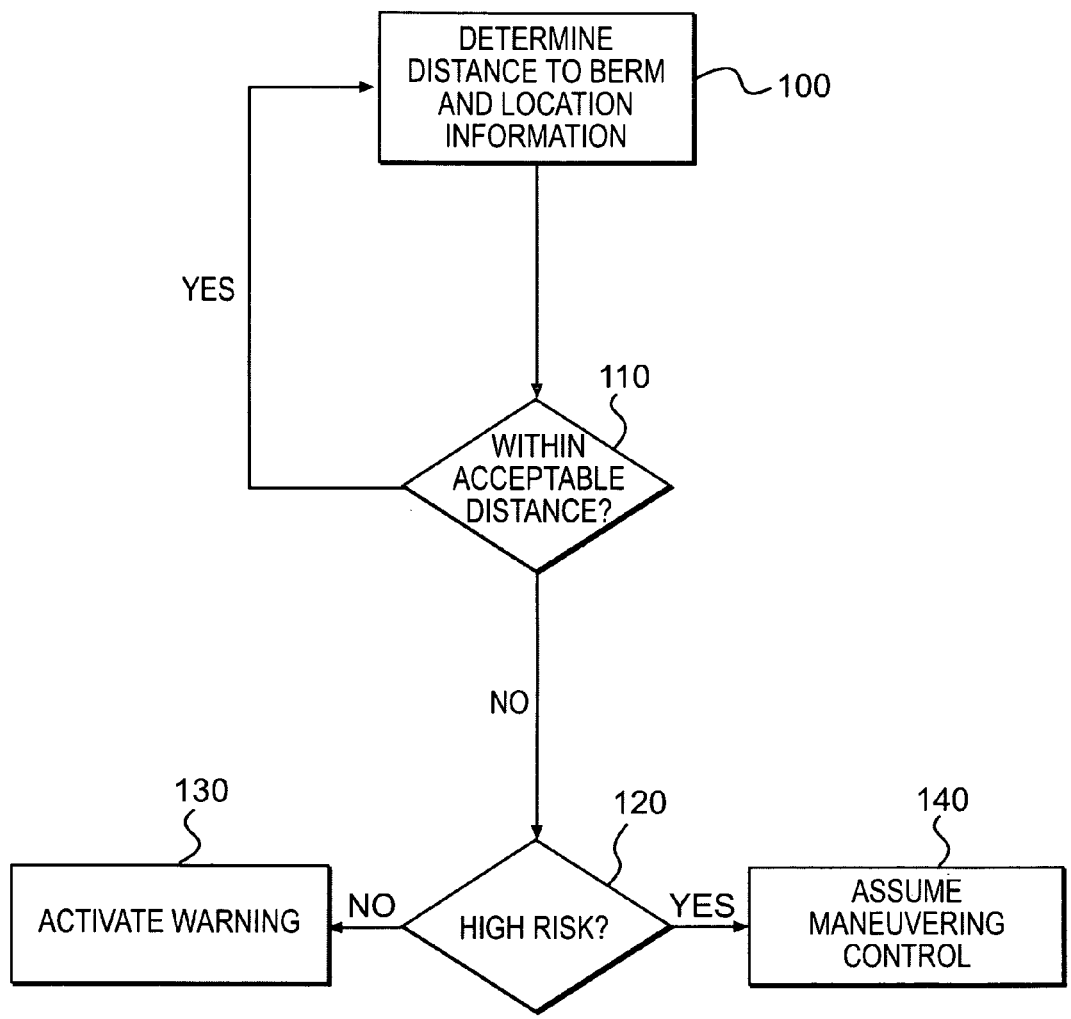
FIG. 2 is a flowchart depicting an exemplary disclosed method associated with operation of the machine of FIG. 1.

FIG. 2 illustrates an exemplary method performed by controller 34 during operation of machine 12. FIG. 2 will be described in more detail in the follow section to better illustrate the disclosed system and its operation

INDUSTRIAL APPLICABILITY

The disclosed guidance system may be applicable to any mobile machine where lane keeping is important. The disclosed guidance system may provide warning and/or autonomous maneuvering in the event of lane deviation. And, the disclosed system may be adaptable and account for varying roadway conditions, environmental conditions, machine conditions, operator conditions, and other similar conditions when providing the warning or autonomously maneuvering the machine. Operation of guidance system 24 will now be described.

As machine 12 is traveling along roadway 14, guidance system 24 may continuously monitor a geographical location of machine 12, associated terrain charcteristics, and a lateral distance from machine 12 to marker 16. That is, based on the location and distance signals generated by locating device 32 and scanning devices 30, controller 34 may determine a local or a global location of machine 12 and an actual lateral distance from machine 12 to roadway marker 16 (Step 100). In addition, controller 34 may compare the actual lateral distance to a desired lateral distance and determine if machine 12 is within an acceptable distance of marker 16 (Step 110). As described above, the desired lateral distance can be preset, adjusted by an operator, and/or adjusted by controller 34 based on a perceived risk level.

If the actual lateral distance is within an acceptable amount of the desired lateral distance (Step 110:YES) for the given conditions, control may return to step 100. However, if the actual lateral distance deviates from the desired lateral distance by a significant amount (i.e., by an amount greater than a threshold amount), controller 34 may determine a current risk level based on the roadway conditions, machine conditions, environmental conditions, operator conditions, etc. (Step 120), and respond to the lateral distance deviation accordingly. For example, if the risk level is low (Step 120: LOW) such as when the deviation amount is relatively small, current conditions are good, and/or the potential severity associated with contact between machine 12 and marker 16 is low, controller 34 may only issue a warning to the operator of machine 12 (Step 130) or perform some other non-maneuvering function according to previously-provided instructions. In contrast, if the risk level is high (Step 120:HIGH), controller 34 may assume autonomous control over machine maneuvering (Step 140). Depending on the magnitude of the risk level and/or according to operator instruction, this autonomous maneuvering could result in steering and/or braking of machine 12.

Several benefits may be associated with the disclosed guidance system. For example, the disclosed guidance system may be simple and utilize relatively inexpensive scanning devices. In addition, information regarding geographical location and associated terrain characteristics may be provided and accounted for when determining an appropriate lateral distance that should be maintained between machine 12 and marker 16. As such, the disclosed guidance system may be able to properly adjust the warning provided to the operator or autonomous control of machine 12 based on this information. Further, the disclosed guidance system may take into account a condition of roadway 14, a condition of machine 12, an environmental conditions, an operator condition, etc., and how these parameters could affect maneuverability of machine 12. In addition, the disclosed guidance system may affect a range of machine maneuvering including steering and braking, thereby enhancing controllability of machine 12.

It will be apparent to those skilled in the art that various modifications and variations can be made to the guidance system of the present disclosure. Other embodiments of the method and system will be apparent to those skilled in the art from consideration of the specification and practice of the guidance system disclosed herein. It is intended that the specification and examples be considered as exemplary only, with a true scope of the disclosure being indicated by the following claims and their equivalents.

What is claimed is:

1. A guidance system for a machine, comprising:
   a scanning device configured to generate a signal indicative of an actual lateral distance from the machine to a roadway marker;
   a locating device configured to determine a geographical location of the machine; and
   a controller in communication with the scanning device and the locating device, the controller being configured to:
   receive a desired lateral distance from the machine to the roadway marker, the desired lateral distance being adjusted based on at least one of geographical location, a condition of a roadway being traversed by the machine, a condition of the machine, or an experience of a machine operator;
   compare the desired lateral distance to the actual lateral distance; and
   implement a response to the comparison based on at least one of the geographical location, the condition of a roadway being traversed by the machine, the condition of the machine, or the experience of a machine operator.

2. The guidance system of claim 1, wherein the scanning device is one of a LIDAR device, a RADAR device, or a SONAR device.

3. The guidance system of claim 1, wherein the roadway marker is an earthen berm.

4. The guidance system of claim 3, wherein the locating device is in communication with the scanning device and configured to determine the geographical location of the machine based on breaks in the earthen berm detected by the scanning device.

5. The guidance system of claim 1, wherein the locating device is a gps device.

6. The guidance system of claim 1, wherein the desired lateral distance is received from an operator of the machine.

7. The guidance system of claim 1, wherein the response is a warning provided to an operator of the machine.

8. The guidance system of claim 1, wherein the response is corrective steering of the machine.

9. The guidance system of claim 1, wherein the response is braking of the machine.

10. The guidance system of claim 1, wherein the condition of the machine is at least one of an age and a type of the machine.

11. The guidance system of claim 1, wherein the condition of the machine is a loading of the machine.

12. A method of guiding a machine, comprising:
    measuring an actual lateral distance from the machine to a roadway marker;
    receiving a desired lateral distance from the machine to the roadway marker;
    comparing the actual lateral distance and the desired lateral distance;
    determining a geographical location of the machine and determining a severity of the machine contacting or crossing the roadway marker based on the geographical location; and
    implementing a response to the comparison based on the severity.

13. The method of claim 12, wherein the roadway marker is an earthen berm, and determining a geographical location includes detecting breaks in the earthen berm.

14. The method of claim 12, wherein the response is at least one of a warning provided to an operator of the machine, corrective steering of the machine, or braking of the machine.

15. The method of claim 12, wherein the method further includes receiving a condition of a roadway being traversed by the machine, a condition of the machine, or a condition of a machine operator, and adjusting at least one of the desired lateral distance or the response based on the at least one of the condition of the roadway, the condition of the machine, or the condition of the machine operator.

16. A machine, comprising:
    a power source;
    a plurality of traction devices associated with the power source to propel and steer the machine;
    a scanning device configured to generate a signal indicative of an actual lateral distance from the machine to an earthen berm; and
    a controller in communication with the scanning device and the locating device, the controller being configured to:
    receive a desired lateral distance from the machine to the earthen berm, the desired lateral distance being adjusted based on a risk value;
    compare the desired lateral distance to the actual lateral distance; and
    implement at least one of a warning provided to an operator of the machine or corrective maneuvering of the machine in response to the comparison based on a magnitude of the risk value.

* * * * *